(12) United States Patent
Gerhart et al.

(10) Patent No.: US 9,315,391 B2
(45) Date of Patent: Apr. 19, 2016

(54) AMMONIA GAS GENERATOR AND METHOD FOR PRODUCING AMMONIA IN ORDER TO REDUCE NITROGEN OXIDES IN EXHAUST GASES

(75) Inventors: Christian Gerhart, Siegsdorf (DE); Thomas Sattelmayer, Erding (DE); Plamen Toshev, Unterschleißheim (DE)

(73) Assignee: ALZCHEM AG, Trostberg (DE)

( * ) Notice: Subject to any disclaimer, the term of this patent is extended or adjusted under 35 U.S.C. 154(b) by 11 days.

(21) Appl. No.: 14/129,378

(22) PCT Filed: Jun. 29, 2012

(86) PCT No.: PCT/EP2012/062750
§ 371 (c)(1),
(2), (4) Date: Dec. 26, 2013

(87) PCT Pub. No.: WO2013/004629
PCT Pub. Date: Jan. 10, 2013

(65) Prior Publication Data
US 2014/0147356 A1    May 29, 2014

(30) Foreign Application Priority Data

Jul. 1, 2011 (DE) .......................... 10 2011 106 233
Jul. 1, 2011 (DE) .......................... 10 2011 106 237
Jul. 1, 2011 (DE) .......................... 10 2011 106 243

(51) Int. Cl.
*C01C 1/04* (2006.01)
*C01C 1/08* (2006.01)
(Continued)

(52) U.S. Cl.
CPC ................ *C01C 1/04* (2013.01); *B01D 53/565* (2013.01); *B01D 53/90* (2013.01); *B01D 53/92* (2013.01);
(Continued)

(58) Field of Classification Search
CPC ..... C01C 1/086; C01C 1/0417; C01C 1/0423; B01J 8/0496
USPC .......................................... 423/212, 356, 358
See application file for complete search history.

(56) References Cited

U.S. PATENT DOCUMENTS 6,444,177 B1    9/2002  Müller et al.
6,928,807 B2    8/2005  Jacob et al.
(Continued)

FOREIGN PATENT DOCUMENTS

CN    101568371    10/2009
DE      4038054     6/1992
(Continued)

OTHER PUBLICATIONS

Written Opinion of the International Searching Authority for PCT/EP2012/062750, mailed Jan. 1, 2014 (5 pages for the original document and 6 pages for the English translation).
(Continued)

*Primary Examiner* — Anthony J Zimmer
*Assistant Examiner* — Justin Bova
(74) *Attorney, Agent, or Firm* — Kilpatrick Townsend & Stockton LLP

(57) ABSTRACT

The invention relates to an ammonia gas generator for producing ammonia from an ammonia precursor substance as well as the use thereof in exhaust aftertreatment systems. The invention further relates to a method for producing ammonia gas to reduce nitrogen oxides in exhaust gases, in particular combustion gases from internal combustion engines such as diesel engines.

23 Claims, 4 Drawing Sheets

Figure 1:
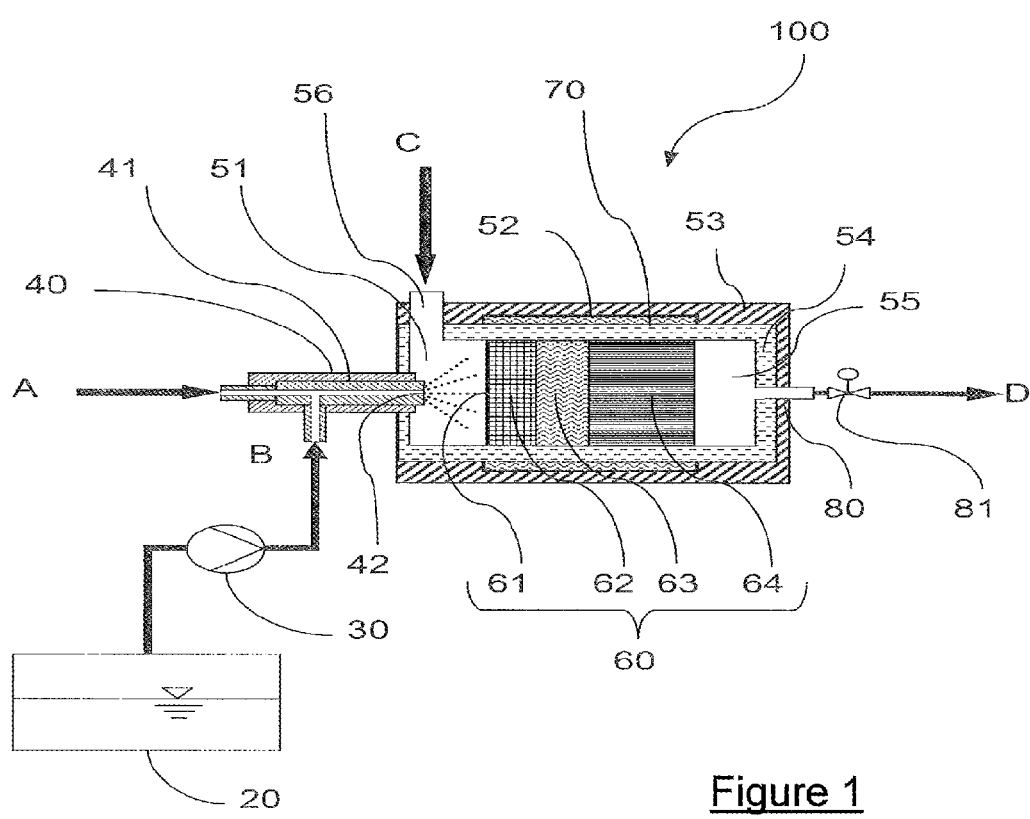

(51) Int. Cl.
  *B01D 53/90* (2006.01)
  *B01D 53/92* (2006.01)
  *B01D 53/94* (2006.01)
  *B01D 53/56* (2006.01)
  *B01J 8/04* (2006.01)
  *F01N 3/20* (2006.01)

(52) U.S. Cl.
  CPC ........ *B01D 53/9409* (2013.01); *B01D 53/9431* (2013.01); *C01C 1/08* (2013.01); *C01C 1/086* (2013.01); *F01N 3/2066* (2013.01); *B01D 2251/2067* (2013.01); *B01D 2251/21* (2013.01); *B01D 2255/808* (2013.01); *B01D 2255/902* (2013.01); *B01J 8/0496* (2013.01); *F01N 2240/25* (2013.01); *F01N 2610/02* (2013.01); *F01N 2610/10* (2013.01); *Y02T 10/24* (2013.01)

(56) References Cited

U.S. PATENT DOCUMENTS

| | | |
|---|---|---|
| 7,682,586 B2 | 3/2010 | Harold et al. |
| 8,153,072 B2 | 4/2012 | Klingberg |
| 8,155,509 B2 | 4/2012 | Brück et al. |
| 2004/0040288 A1 | 3/2004 | Jacob et al. |
| 2005/0013756 A1 | 1/2005 | Amou et al. |
| 2006/0153748 A1 | 7/2006 | Huthwohl et al. |
| 2007/0048204 A1 | 3/2007 | Mital et al. |
| 2008/0050297 A1 | 2/2008 | Harold et al. |
| 2008/0148717 A1 | 6/2008 | Ohshima et al. |
| 2008/0314027 A1 | 12/2008 | Barber et al. |
| 2009/0127511 A1 | 5/2009 | Bruck et al. |
| 2009/0324453 A1 | 12/2009 | Harinath et al. |
| 2010/0047144 A1 | 2/2010 | Hammer et al. |
| 2011/0008228 A1 | 1/2011 | Hammer et al. |
| 2014/0127100 A1 | 5/2014 | Gerhart et al. |
| 2014/0150410 A1 | 6/2014 | Gerhart et al. |

FOREIGN PATENT DOCUMENTS

| | | |
|---|---|---|
| DE | 4203807 | 8/1993 |
| DE | 4230056 | 3/1994 |
| DE | 19960976 | 7/2001 |
| DE | 102006023147 | 1/2008 |
| DE | 102007019460 | 11/2008 |
| DE | 102007033424 | 1/2009 |
| DE | 102009042386 | 3/2010 |
| EP | 487886 | 6/1992 |
| EP | 586913 | 3/1994 |
| EP | 1052009 | 11/2000 |
| EP | 1338562 | 8/2003 |
| EP | 1348840 | 10/2003 |
| EP | 1481719 | 12/2004 |
| EP | 1647324 | 4/2006 |
| JP | 2006170013 | 6/2006 |
| JP | 2008267269 | 11/2008 |
| JP | 2009062860 | 3/2009 |
| WO | 2008077587 | 7/2008 |
| WO | 2008077588 | 7/2008 |

OTHER PUBLICATIONS

Written Opinion of the International Searching Authority for PCT/EP2012/062757, mailed Jan. 1, 2014 (4 pages for the original document and 7 pages for the English translation).

Written Opinion of the International Searching Authority for PCT/EP2012/062752, mailed Jan. 1, 2014 (5 pages for the original document and 7 pages for the English translation).

German Patent Application No. DE102011106233.9, "Office Action", Apr. 30, 2012, 5 pages.

German Patent Application No. DE102011106237.1, "Office Action", Mar. 30, 2012, 5 pages.

German Patent Application No. DE102011106243.6, "Office Action", Mar. 28, 2012, 5 pages.

International Patent Application No. PCT/EP2012/062750, "International Search Report", Aug. 9, 2013, 7 pages.

International Patent Application No. PCT/EP2012/062752, "International Search Report", Aug. 9, 2013, 6 pages.

International Patent Application No. PCT/EP2012/062757, "International Search Report", Aug. 9, 2013, 6 pages.

U.S. Appl. No. 14/129,402, "Non-Final Office Action" dated Jan. 5, 2015, 22 pages.

DE4230056, "English translation of German Patent Application No. DE 4230056 A1 (Mar. 10, 1994)".

English translation of Zhao et al., "Application of Urea Pyrolysis to Prepare Ammonia in SCR Denitrification", Thermal Power Generation, vol. 38, Issue 8, pp. 65-67, 2009.

Zhao et al., "Application of Urea Pyrolysis to Prepare Ammonia Technology into SCR Denitrification", Thermal Power Generation, vol. 38, Issue 8, pp. 65-67, 2009.

U.S. Appl. No. 14/129,390, Non-Final Office Action mailed on Jul. 14, 2015, 13 pages.

U.S. Appl. No. 14/129,402, Final Office Action mailed on Jul. 29, 2015, 20 pages.

Non-Final Office Action in U.S. Appl. No. 14/129,402, mailed Nov. 5, 2015, 24 pages.

U.S. Appl. No. 14/129,390, "Final Office Action", Dec. 1, 2015, 18 pages.

AMMONIA GAS GENERATOR AND METHOD FOR PRODUCING AMMONIA IN ORDER TO REDUCE NITROGEN OXIDES IN EXHAUST GASES

PRIOR RELATED APPLICATIONS

This application is a National Phase application of International Application No. PCT/EP2012/062750 filed Jun. 29, 2012, which claims priority to German Patent Application No. 102011106233.9, filed Jul. 1, 2011, German Patent Application No. 102011106243.6, filed Jul. 1, 2011, and German Patent Application No. 102011106237.1, filed Jul. 1, 2011, each of which is incorporated herein by reference in its entirety.

The present invention relates to an ammonia gas generator for generating ammonia from an ammonia precursor substance, to a method for producing ammonia gas, and to the use thereof in exhaust treatment systems for reducing nitrogen oxides in exhaust.

The exhaust of internal combustion engines often contains substances of which the release into the environment is undesirable. Therefore, many countries set limits which have to be adhered to on the release of these pollutants, such as in the exhausts of industrial facilities or automobiles. These pollutants include nitrogen oxides ($NO_x$), such as in particular nitrogen monoxide (NO) or nitrogen dioxide ($NO_2$), as well as a range of other pollutants.

The release of these nitrogen oxides from the exhaust of combustion engines can be reduced in various ways. At this point, emphasis should be placed on reduction by way of additional exhaust treatment measures, in particular based on selective catalytic reduction (SCR). What these methods have in common is that a reducing agent which acts selectively on the nitrogen oxides is added to the exhaust, the nitrogen oxides thus being converted in the presence of a corresponding catalyst (SCR catalyst). This converts the nitrogen oxides into substances which are less harmful to the environment, such as nitrogen and water.

One reducing agent for nitrogen oxides which is already used nowadays is urea ($H_2N$—CO—$NH_2$), which is added to the exhaust in the form of an aqueous urea solution. In this context, the urea in the exhaust stream may break down into ammonia ($NH_3$), for example as a result of the action of heat (thermolysis) and/or a reaction with water (hydrolysis). The ammonia which is thus formed is the actual reducing agent for nitrogen oxides.

Exhaust treatment systems for automobiles have been being developed for some time, and this is discussed in numerous publications. Thus for example European patent EP 487 886 B1 discloses a method for selective catalytic $NO_x$ reduction in oxygen-containing exhaust of diesel engines, in which urea and the thermolysis products thereof are used as reducing agents. In addition, a device for generating ammonia in the form of a tubular evaporator is disclosed, and comprises a spraying device, an evaporator comprising an evaporator tube, and a hydrolysis catalyst.

Further, European patent EP 1 052 009 B1 discloses a method and a device for carrying out the method for thermal hydrolysis and metering of urea or urea solutions in a reactor with the aid of a partial exhaust stream. In the method, a partial stream of the exhaust is removed from an exhaust line upstream from the SCR catalyst and passed through the reactor, the partial stream, which is loaded with ammonia after the hydrolysis in the reactor, likewise further being passed back into the exhaust line again upstream from the SCR catalyst.

In addition, European patent EP 1 338 562 B1 discloses a device and method which make use of the catalytic reduction of nitrogen oxides by ammonia. In this context, the ammonia is obtained from urea in solid form under flash thermolysis conditions and from isocyanic acid by hydrolysis, and supplied to the exhaust stream of a vehicle.

Further, European patent application EP 1 348 840 A1 discloses an exhaust purification system in the form of an assembly, which can be transported as a whole unit, in the form of a 20-foot container. The system is operated in such a way that a urea or ammonia solution is injected into the exhaust stream directly by means of an injection device. The nitrogen oxides contained in the exhaust are reduced on an SCR catalyst.

Further, German patent application DE 10 2006 023 147 A1 discloses a device for generating ammonia which is part of an exhaust treatment system.

In addition, international applications WO 2008/077 587 A1 and WO 2008/077 588 A1 disclose a method for the selective catalytic reduction of nitrogen oxides in exhausts of vehicles by means of aqueous guanidinium salt solutions. This method uses a reactor which generates ammonia from the aqueous guanidinium salt solutions.

Even though ammonia gas generators have been known for some time, thus far the technology has not been implemented in a vehicle or any other application. Thus far, the concept of direct injection of an ammonia precursor substance into the exhaust stream of an internal combustion engine has been pursued, this ammonia precursor substance being broken down into the actual reducing agent in the exhaust stream by suitable measures. However, as a result of incomplete decomposition or secondary reactions of decomposition products in the exhaust line, depositions are always observed, and damage the catalysts and filters which are also present in the exhaust line.

Therefore, an object of the present invention is to provide an ammonia gas generator and a method for producing ammonia which overcome these drawbacks of the prior art. A further object of the present invention is to provide an ammonia gas generator which is of a simple construction, provides a high conversion rate of ammonia precursor substances into ammonia gas, and makes long-term use without maintenance possible. In addition, it should be possible to use the ammonia gas generator universally, it also being possible in particular to use different types of ammonia precursor substances. Further, the method for generating ammonia should be able to be carried out by simple apparatus measures, provide a high conversion rate of ammonia precursor substances into ammonia gas, and make long-term use without maintenance possible.

These problems are solved by an ammonia gas generator according to claim 1 and by a method for generating ammonia from a solution of an ammonia precursor substance by means of an ammonia gas generator according to claim 9. Thus, in accordance with a first embodiment, the subject matter of the present invention is an ammonia gas generator, for generating ammonia from a solution of an ammonia precursor substance, which comprises a catalyst unit, the catalyst unit in turn comprising a catalyst for decomposing and/or hydrolysing ammonia precursor substances into ammonia and a mixing chamber upstream from the catalyst, and the catalyst being of a catalyst volume $VK_{at}$ and the mixing chamber being of a mixing chamber volume $V_{Misch}$. Further, the ammonia gas generator comprises an injection device for introducing a solution of the ammonia precursor substance into the mixing chamber and an outlet for the ammonia gas formed, the ammonia gas generator comprising an inlet for a carrier gas which generates a tangential carrier gas stream with respect to the solution injected into the mixing chamber.

At this point, it should be emphasised that an ammonia gas generator according to the present invention is a separate unit for generating ammonia from ammonia precursor substances. A unit of this type may for example be used for reducing nitrogen oxides in industrial exhausts or for exhaust treatment of exhaust from combustion engines, such as diesel engines. This ammonia gas generator may also operate independently or be operated using lateral exhaust streams, although in any event nitrogen oxides are not reduced by means of ammonia until a subsequent process step. If an ammonia gas generator according to the invention is used as a separate component in an exhaust treatment system of a combustion engine, for example of a diesel engine, the nitrogen oxides in the exhaust stream can thus be reduced without introducing further catalysts for breaking down ammonia precursor substances or other components into the exhaust stream itself. The ammonia produced using the ammonia gas generator according to the invention can thus be introduced into the exhaust stream as required. A potential decrease in the service life of the SCR catalyst due to impurities in the form of depositions, for example of ammonia precursor substances or decomposition products of ammonia precursor substances, is also prevented.

Thus, according to the invention, an ammonia precursor substance is not supplied to an exhaust stream, ammonia subsequently being formed in situ from the ammonia precursor substance and acting as a reducing agent in the exhaust stream. Instead, according to the invention, ammonia is supplied to the exhaust stream, having been formed in advance in a separate unit, specifically the ammonia gas generator according to the invention. Thus, according to the invention, ammonia is in particular initially generated from an ammonia precursor substance in an ammonia gas generator as a separate unit. This ammonia, and not the ammonia precursor substance, is subsequently introduced into an exhaust stream, in particular so as to bring about reduction of nitrogen oxides therein.

The supply of the ammonia takes place according to the invention preferably upstream from an SCR catalyst which is located in the exhaust stream. Further, the supply of the ammonia preferably takes place downstream from the combustion engine. In a further preferred embodiment, the supply of the ammonia takes place downstream from an oxidation catalyst located in the exhaust stream.

It is essential to the invention that the ammonia gas generator comprises an inlet for a carrier gas which generates a tangential carrier gas stream with respect to the solution injected into the mixing chamber.

The inlet for the carrier gas is preferably located in the mixing chamber.

Surprisingly, it has been found that, as a result of the tangential carrier gas stream (also referred to as the transport gas stream in the following), depositions on the walls of the catalyst unit in the region of the mixing chamber can be further inhibited, and it can be provided that the carrier gas (also referred to as the transport gas in the following) and the solution of the ammonia precursor substance are constantly thoroughly mixed. If a tangential carrier gas stream of this type is not used, the wall of the catalyst unit in the region of the mixing chamber can be wetted by spraying the solutions of ammonia precursor substance into the mixing chamber, and undesired secondary reactions such as polymerisation of the ammonia precursor substance can take place. These secondary reactions lead to undesired depositions in the region of the mixing chamber, as a result of which constant thorough mixing of the carrier gas and the solution of the ammonia precursor substance, which mixing is exceptionally important for the operation of the generator, is no longer made possible. Due to the lack of thorough mixing of the carrier gas with the solution, additional depositions in and on the catalyst itself can also be observed. As a result of the tangential carrier gas stream, an eddy mist current comprising the droplets is generated, and is guided axially in the direction of the hydrolysis catalyst onto the hydrolysis catalyst end face. This eddy mist current makes very good conversion into ammonia possible on the catalyst. The tangential supply of the carrier gas is provided in the head region of the generator, preferably at the level of the spraying device of the ammonia precursor solution into the catalyst unit or into the mixing chamber. In this context, the gas stream is introduced as shallowly as possible against the wall of the mixing chamber, in such a way that a downwardly directed eddy current in the catalyst unit in the direction of the catalyst end face sets in.

The carrier gas, and in particular the tangential carrier gas stream, is preferably introduced into the mixing chamber at a temperature of up to 550° C., preferably at a temperature of 250 to 550° C., more preferably at a temperature of 250 to 400° C. and most preferably at a temperature of 300 to 350° C.

Ideally, in other words so as to achieve a conversion of the ammonia precursor substance into ammonia of more than 95% and prevent the precursor substance from contacting the generator wall, particular decisive conditions are preferably met during metering. Preferably, injection of the ammonia precursor substance into the mixing chamber is carried out in such a way that, for a given catalyst end face, the spray cone diameter upon incidence on the catalyst end face is at most 98%, preferably at most 95%, of the catalyst diameter. By contrast, the spray cone diameter is preferably at least 80%, more preferably at least 83%, of the catalyst end face diameter so as to prevent an excessively high concentration for a given area and thus excessive loading of the end face with precursor substance. Excessive loading of the catalyst end face leads to insufficient contact with the catalyst and to excessive cooling as a result of the evaporating liquid, and thus likewise to incomplete conversion and to undesired secondary reactions which are connected with depositions. Ideally, this therefore results in combinations which are preferably to be used of a tangential carrier gas stream with further parameters which are specified by the injection device. In this context, in particular the type of the injection device to be used and the distance of the opening of the injection device from the given catalyst end face should be mentioned.

In connection with the present invention, an injection device should be understood to be any device which sprays, atomises or otherwise forms into drops a solution, preferably an aqueous solution, of an ammonia precursor substance, the solution of the ammonia precursor substance being in the form of drops which in particular have a droplet diameter $d_{32}$ of less than 25 µm. In connection with the present invention, the droplet diameter $d_{32}$ relates to the Sauter mean diameter according to the German industry standard DIN 66 141.

Thus, in accordance with a preferred embodiment of the present invention, it is provided that the injection device in turn comprises a nozzle which generates droplets having a droplet diameter $d_{32}$ of less than 25 µm. In this context, according to the present invention, it is preferably further provided that the nozzle generates droplets having a droplet diameter $d_{32}$ of less than 20 µm and most preferably less than 15 µm. Simultaneously or independently, it is further preferred for the nozzle to generate droplets having a droplet diameter $d_{32}$ of more than 0.1 µm and in particular more than 1 µm. When nozzles of this type are used, an ammonia formation level AG of >95% (see above) can also be achieved. In addition, a particularly uniform distribution of the solution on the catalyst end face can be achieved. In this context and in the following, the ammonia formation level AG is defined as the molar amount of $NH_3$ generated in the method with respect to the molar amount of ammonia which should theoretically be generated by complete hydrolysis of the ammonia precursor substance. According to the present invention, an ammonia formation level of >95% is considered to be complete conversion.

In accordance with a particularly preferred variant, it may in particular be provided that the injection device in turn comprises a nozzle which is what is known according to the present invention as a two-substance nozzle. In this context, a two-substance nozzle is understood to be a nozzle which uses a pressurised gas, generally air, as a propellant for breaking up the surface of the liquid phase and thus for droplet formation. This pressurised gas is also referred to as atomisation air. This form of the nozzle makes particularly fine distribution of the ammonia precursor substance possible, along with a droplet diameter $d_{32}$ of less than 25 µm, in particular less than 20 µm.

In this context, the propellant, in particular the atomisation air, is preferably introduced into the mixing chamber together with the solution of the ammonia precursor substance, through the same nozzle opening.

Independently or simultaneously, the injection device may also comprise at least two nozzles, which can in particular be switched jointly or separately, for introducing the ammonia precursor substance into the mixing chamber.

Alternatively, however, it may also be provided that the injection device comprises what is known as a flash evaporator.

The spray cone according to the present invention is the cone of the solution to be sprayed which can be generated using a nozzle or a plurality of nozzles having a defined spray angle α, the spray cone diameter being the diameter which is obtained when the droplets are incident on the catalyst end face. This is set by the liquid pressure of 0.1 to 10 bar on the solution to be sprayed at 25° C. and optionally by the atomisation air in the operating range of 0.5 to 10 bar (for two-substance nozzles) when using carrier gas.

In order to achieve a spray cone diameter of at most 98% of the catalyst diameter, it can also be provided in accordance with a development of the present invention that the injection device in turn comprises at least one nozzle, in particular a two-substance nozzle which has a theoretical spray angle α of 10° to 90°. In particular, it can simultaneously or independently be provided that the distance of the nozzle opening from the end face of the catalyst is 15 to 2000 mm.

Particularly preferable is a nozzle, in particular a two-substance nozzle, which has a theoretical spray angle α of at least 10°, in particular at least 20°, in particular at least 25°, particularly preferably of at least 30°, particularly preferably of at least 35°, particularly preferably of at least 40° and most preferably of at least 45°. Simultaneously or independently, nozzles are further preferred which have a theoretical spray angle α of at most 90°, in particular of at most 80°, in particular of at most 75°, in particular of at most 70°, particularly preferably of at most 65°, particularly preferably of at most 60°, particularly preferably of at most 55° and most preferably of at most 50°. As stated previously, by way of targeted use of a nozzle having a defined spray angle α, a uniform distribution of the solution to be sprayed can be achieved, without depositions occurring on the walls of the catalyst end face.

According to the present invention, the theoretical spray angle α (also referred to as the spray angle α in the following) should be understood to be a spray angle which is set at the outlet of the nozzle opening or nozzle openings with an operating pressure of 0.1 to 10 bar on the solution to be sprayed at 25° C. and optionally with the atomisation air in the operating range from 0.5 to 10 bar (for two-substance nozzles), without a carrier gas or any other influence on the sprayed solution being present.

A similar effect is produced if a nozzle is used which comprises a first number of nozzle openings for introducing the solution of the ammonia precursor substance into the catalyst unit, which are annularly surrounded by a second number of nozzle openings for introducing a carrier gas or atomisation air into the catalyst unit.

Alternatively, it may also be provided that at least one inlet for carrier gas is provided around the nozzle and is formed in such a way that the carrier gas forms a casing around the solution introduced into the mixing chamber. In this way, the sprayed solution is enclosed in a casing of carrier gas, in such a way that no wetting of the inner wall is observed.

In a further embodiment, the invention therefore relates to an ammonia gas generator which comprises at least one inlet for a carrier gas. The inlet is preferably located in the mixing chamber and is in particular separate or separated from the nozzle opening through which the solution of the ammonia precursor substance is introduced. The carrier gas may thus be introduced independently of the ammonia precursor substance solution. The inlet preferably generates a tangential or parallel carrier gas stream with respect to the solution injected into the mixing chamber. For a parallel carrier gas stream, one or more inlet openings for carrier gas are preferably arranged in the same wall in which the injection device for introducing the solution of the ammonia precursor substance is located.

In the present invention, it is further provided that the distance of the nozzle opening from the end face of the catalyst can comprise in particular from 15 to 1500 mm, particularly preferably from 15 to 1000 mm and most preferably from 15 to 800 mm. Independently or simultaneously, however, it may also be provided that the distance of the nozzle opening from the end face of the catalyst is at least 30 mm, preferably at least 40 mm, particularly preferably at least 50 mm, particularly preferably at least 60 mm, particularly preferably at least 100 mm and most preferably at least 300 mm, and further independently or simultaneously at most 1500 mm, in particular at most 1000 mm, in particular at most 800 mm, in particular at most 500 mm, in particular at most 400 mm, particularly preferably at most 200 mm and most preferably at most 150 mm.

In accordance with a development of the present invention, it is also provided that the ratio of the volume of the mixing chamber $V_{Misch}$ to the volume of the catalyst $V_{Kat}$ is a ratio of 1.5:1 to 5:1. Surprisingly, it has been found that the sprayed ammonia precursor substance can be broken down completely (conversion >95%) into ammonia if the droplets of the solution are evaporated in part in advance prior to incidence on the catalyst end face. This may be ensured in that the volume of the mixing chamber is greater than the volume of the catalyst. By way of partial evaporation of the droplets, the solution is already supplied with enough energy to prevent excessive cooling on the catalyst end face as a result of excessively large drops, and thus poor decomposition or by-product formation is countered. In addition, a corresponding mixing chamber volume $V_{Misch}$ ensures that the sprayed ammonia precursor substance is incident on the catalyst, distributed over the cross-section of the catalyst homogeneously in the transport gas stream, as an aerosol, and spots having an excessive concentration, which would in turn lead to poorer conversion, are prevented. In this context, it is most preferably provided that the ratio of the volume of the mixing chamber $V_{Misch}$ to the volume of the catalyst $V_{Kat}$ is from 2.5:1 to 5:1, particularly preferably 3:1 to 5:1 and most preferably 3.5:1 to 5:1.

The volume of the catalyst $V_{Kat}$ is preferably 50 ml to 1000 l. The volume of the mixing chamber $V_{Misch}$ is preferably at least 10 ml, preferably at least 50 ml, more preferably at least 100 ml, more preferably at least 200 ml, more preferably at least 1000 ml, more preferably at least 2000 ml and more preferably at least 5000 ml. Simultaneously or independently, the volume of the mixing chamber $V_{Misch}$ is preferably at most 2.5 l, more preferably at most 10 l, more preferably at most 80 l, more preferably at most 500 l, more preferably at most 1200 l and more preferably at most 2000 l.

Further, in accordance with the present invention a catalyst unit should be understood to be a unit which comprises a housing for receiving a catalyst, a mixing chamber which is upstream from the catalyst in the flow direction, and at least one catalyst for decomposing and/or hydrolysing ammonia precursor substances into ammonia, the catalyst having a catalyst volume $V_{Kat}$ and the mixing chamber having a mixing chamber volume $V_{Misch}$. Optionally, the catalyst unit may additionally comprise an outlet chamber which is downstream from the catalyst in the flow direction for outputting the ammonia gas formed.

In the context of the present invention, any catalyst which makes it possible to release ammonia from the precursor substance under catalytic conditions may be used as the catalyst for decomposing and/or hydrolysing ammonia precursor substances. A preferred catalyst hydrolyses the ammonia precursor substance to form ammonia and further harmless substances such as nitrogen, carbon dioxide and water. The catalyst is thus preferably a hydrolysis catalyst.

If for example a guanidinium salt solution is used, in particular a guanidium formate solution or a urea solution or mixtures thereof, the catalytic decomposition into ammonia may take place in the presence of catalytically active, non-oxidation-active coatings of oxides, selected from the group of titanium dioxide, aluminium oxide and silicon dioxide and mixtures thereof, and/or hydrothermically stable zeolites, which are fully or partially metal-exchanged, in particular iron zeolites of the ZSM 5 or BEA type. In this context, in particular the subgroup elements and preferably iron or copper are possibilities for the metals. The metal oxides, such as titanium oxide, aluminium oxide and silicon dioxide, are preferably applied to metal carrier materials such as heating line alloys (in particular chromium aluminium steels).

Particularly preferred catalysts are hydrolysis catalysts which in particular comprise catalytically active coatings of titanium dioxide, aluminium oxide and silicon dioxide and mixtures thereof.

Alternatively, catalytic decomposition of the guanidium formate solutions or the remaining components to form ammonia and carbon dioxide may also be provided, catalytically active coatings of oxides, selected from the group of titanium dioxide, aluminium oxide and silicon oxide and mixtures thereof, and/or hydrothermally stable zeolites, which are fully or partly metal-exchanged, are used, and are impregnated with gold and/or palladium as oxidation-active components. The corresponding catalysts comprising palladium and/or gold as active components preferably have a precious metal content of 0.001 to 2% by weight, in particular 0.01 to 1% by weight. Using oxidation catalysts of this type, it is possible to prevent the undesired formation of carbon monoxide as a by-product during the decomposition of the guanidinium salt during the generation of ammonia.

Preferably, a catalytic coating comprising palladium and/or gold as active components, having a precious metal content of 0.001 to 2% by weight, in particular 0.01 to 1% by weight, is used for the catalytic decomposition of the guanidium formate and optionally the further components.

Thus, a further subject matter of the present invention is an ammonia gas generator which comprises a catalyst which is in particular a hydrolysis catalyst, the catalyst comprising a catalytically active coating which is impregnated with gold and/or palladium, in particular having a gold and/or palladium content of 0.001 to 2% by weight (with respect to the catalytic coating). More preferably, this catalyst comprises a catalytically active coating of oxides selected from the group of titanium dioxide, aluminium oxide and silicon dioxide and mixtures thereof, and/or hydrothermally stable zeolites, which is impregnated with gold and/or palladium, the content of gold and/or palladium more preferably being 0.001 to 2% by weight (with respect to the catalytic coating).

In the context of the present invention, it is possible to use a hydrolysis catalyst which consists of at least two portions, in the flow direction, the first portion containing non-oxidation-active coatings and the second portion containing oxidation-active coatings.

Preferably, 5 to 90% by volume of this catalyst consists of non-oxidation-active coatings and 10 to 95% by volume consists of oxidation-active coatings. In particular, 15 to 80% by volume of this catalyst consists of non-oxidation-active coatings and 20 to 85% by volume consists of oxidation-active coatings. Alternatively, the hydrolysis may also be carried out in the presence of two catalysts arranged in series, the first catalyst containing non-oxidation-active coatings and the second catalyst containing oxidation-active coatings. More preferably, the first hydrolysis catalyst may also be a heated catalyst and the second hydrolysis catalyst may be an unheated catalyst.

Moreover, it may be provided to use a hydrolysis catalyst which consists of at least two portions, the first portion, arranged in the flow direction, being in the form of a heated catalyst and the second portion, arranged in the flow direction, being in the form of an unheated catalyst. Preferably, 5 to 50% by volume of the catalyst consists of the first portion and 50 to 95% by volume consists of the second portion.

According to a particularly preferred embodiment of the present invention, it is therefore provided that the ammonia gas generator comprises a catalyst unit comprising a hydrolysis catalyst which is at least divided in two, particularly preferably at least divided into three, of which the first part in the flow direction is configured as a heated catalyst which preferably comprises a direct electrical resistance heater and/or a jacket heater, while the second part is configured as an unheated catalyst which is most preferably followed downstream by a third part configured as an unheated catalyst having a mixer structure.

An ammonia gas generator is particularly preferred which comprises a catalyst unit of which the catalyst has a ratio of the diameter of the catalyst $D_{Kat}$ to the length L of the catalyst of 1:1 to 1:5, in particular of 1:2 to 1:4 and most preferably of 1:3. The catalyst diameter $D_{Kat}$ is preferably 20 to 2000 mm, in particular 30 to 1000 mm and even more preferably 30 to 100 mm. However, it may also be provided that the diameter $D_{Kat}$ is 30 to 80 mm, 80 to 450 mm or 450 to 1000 mm.

In this context, it is further preferred for the catalyst to be of a length L of 30 mm to 2000 mm, particularly preferably of 70 mm to 1000 mm and most preferably of 70 mm to 700 mm.

It has been found that, for complete catalytic conversion of the ammonia precursor substances, catalysts having a catalyst cell count of at least 60 cpsi (cpsi: cells per square inch—cell count on the end face of the catalyst) and the catalyst volumes already described above are preferably used. In this context, the increasing counter pressure (loss of pressure by way of the catalyst) limits the catalyst cell count to at most 800 cpsi for an application in an ammonia gas generator. Catalysts, in particular hydrolysis catalysts, are particularly preferred which have a catalyst cell count of 100 to 600 cpsi on the end face, of to 100 to 500 cpsi on the end face and most preferably of 100 to 400 cpsi on the end face of the catalyst.

As regards the configuration of the catalyst unit, it has been found in the tests that a cylindrical construction is particularly suitable. In this case, the tangential carrier gas stream can take full effect. By contrast, other constructions are less suitable, since in this case an excessively strong turbulence can be observed. Thus, a further subject matter of the present invention is an ammonia gas generator which comprises a catalyst unit which is in the form of a cylinder.

Moreover, it has been found to be particularly advantageous for the ammonia gas generator to comprise a catalyst unit which in turn comprises at least one thermal insulation layer, in particular a thermal insulation layer of microporous cladding material.

According to the present invention, ammonia precursor substances are understood to be chemical substances which can be placed in solution and which can split off or otherwise release ammonia by physical and/or chemical processes. According to the present invention, in particular urea, urea derivatives, guanidine, biguanidine and salts of these compounds and salts of ammonia may be used as ammonia precursor compounds. According to the present invention, in particular urea and guanidine or salts thereof can be used. In particular the salts which are formed from guanidines and organic or inorganic acids may be used. In this context, guanidinium salts of general formula (I) should be considered to be particularly preferred,

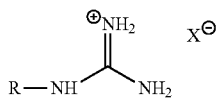

where
R=H, $NH_2$ or $C_1$-$C_{12}$ alkyl,
$X^{\ominus}$=acetate, carbonate, cyanate, formate, hydroxide, methylate or oxalate.

Guanidium formate is particularly preferred.

In the context of the present invention, these guanidinium salts may be used in the form of an individual substance or a mixture of two or more different guanidinium salts. In accordance with a preferred embodiment, the guanidinium salts which are used according to the invention are combined with urea and/or ammonia and/or ammonium salts. Alternatively, however, in accordance with a further embodiment of the present invention aqueous urea solutions may also be used. The mixing ratios of guanidinium salt with urea and ammonia or ammonium salts can be varied within wide limits. However, it has been found to be particularly advantageous if the mixture of guanidinium salt and urea has a guanidinium salt content of 5 to 60% by weight and a urea content of 5 to 40% by weight, in particular of 5 to 35% by weight. Further, mixtures of guanidinium salts and ammonia or ammonium salts having a guanidinium salt content of 5 to 60% by weight and an ammonia or ammonium salt content of 5 to 40% by weight should be considered to be preferred. Alternatively, however, a urea solution, in particular an aqueous urea solution, may be used.

Compounds of general formula (II) have been found to be particularly expedient as ammonium salts,

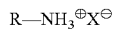 (II)

where
R=H, $NH_2$ or $C_1$-$C_{12}$ alkyl,
$X^{\ominus}$=acetate, carbonate, cyanate, formate, hydroxide, methylate or oxalate.

The ammonia precursor substances which are used according to the invention, in particular guanidinium salts, or optionally the further components, consisting of urea or ammonium salts, are used in the form of a solution, predominantly water and/or a $C_1$-$C_4$ alcohol preferably being used as the solvent. In this context, the aqueous and/or alcoholic solutions have a preferred solids content of 5 to 85% by weight, in particular 30 to 80% by weight.

In this context, it has surprisingly been found that according to the present invention both aqueous guanidium formate solution in a concentration of 20 to 60% by weight and aqueous urea solution in a concentration of 25 to 40% by weight, as well as aqueous mixtures of guanidium formate and urea solutions, the mixture containing guanidium formate and urea at a concentration of 5 to 60% by weight guanidium formate and 5 to 40% by weight urea, may particularly expediently be used.

In this context, the aqueous solution of the ammonia precursor substances, in particular the guanidinium salts, the mixtures of guanidinium salts or the guanidinium salts in combination with urea in water have a preferred ammonia formation potential of 0.2 to 0.5 kg ammonia per liter of solution, in particular 0.25 to 0.35 kg ammonia per liter of solution.

According to a further aspect, a method for generating ammonia from a solution of an ammonia precursor substance by means of an ammonia gas generator, in particular a method for continuously generating ammonia, more preferably by means of an ammonia gas generator described hereby, is a further subject matter of the present invention. This ammonia gas generator comprises a catalyst unit, which comprises in turn a catalyst for decomposing and/or hydrolysing ammonia precursor substances into ammonia and a mixing chamber upstream from the catalyst in the flow direction, the catalyst being of a catalyst volume $V_{Kat}$ and the mixing chamber being of a mixing chamber volume $V_{Misch}$. Further, the ammonia gas generator comprises an injection device for introducing the solution of the ammonia precursor substance into the mixing chamber and an outlet for the ammonia gas formed. It is essential to the invention that in the new method, the solution of the ammonia precursor substance is introduced into the mixing chamber separately from a carrier gas and the carrier gas is introduced tangentially to the solution of the ammonia precursor substance.

Due to the solution of the ammonia precursor substance being introduced separately from the carrier gas, targeted metering of the required energy amount or the heat flow can be produced for error-free, continuous operation of the generator. It has been found that the method can be produced by a sufficient amount of energy at a corresponding temperature level without resulting in undesired by-products. Complete decomposition of the ammonia precursor solutions which can be used into ammonia at a given amount or volume flow of solution requires a corresponding amount or volume flow of energy in the form of heat at a temperature level which is required for complete decomposition. The temperature level is determined in this case by the hydrolysis catalyst which is used. The energy which is predominantly introduced into the method preferably comes from the carrier gas stream.

According to the invention, an ammonia gas generator is to be operated in particular technically and economically if the energy introduced for the decomposition of the ammonia precursor solution from the waste heat of the carrier gas is used. In this context, the amount of carrier gas does not automatically correlate to the metered amount of the liquid solution, since the usable amount of energy of the carrier gas varies with the temperature. A carrier gas stream at a slightly lower temperature level, thereby connected to a slightly lower temperature difference between input and output in the ammonia gas generator, can for example be compensated by a higher carrier gas mass flow and thus a higher heat flow discharge into the generator.

It has been found that for example also a partial stream of an exhaust gas can be used as a carrier gas or a different carrier gas such as a partial stream of the engine charge air which is preconditioned to a corresponding temperature level by means of a heat exchanger. If a partial stream of an exhaust should be used, it has found to be particularly advantageous for the partial stream to contain less than 5% of the total exhaust. However, according to a continuation, it may also be provided that a partial stream which contains at least 0.1% of the total exhaust and more preferably less than 4% and most preferably less than 2% of the total exhaust is used as a transport gas.

A partial stream of the exhaust means the percentage proportion, in percent by mass, which is branched off from the main exhaust stream and passed through the generator as a transport or carrier gas stream.

In principle, according to the invention any gas may be used as a carrier gas stream. Since the carrier gas stream should preferably be at a temperature of 250° C. to 550° C., for good energy efficiency a gas which has already been heated is preferably used, such as charge-air or part of the exhaust stream. However, it is also possible to heat any desired carrier gas to the desired temperature.

According to a further advantageous embodiment of the method, it has been found that a particularly high efficacy of the method can be achieved if the solution of the ammonia precursor substance is injected at a pressure of at least 0.5 bar and the atomisation air is injected at a pressure of 0.5 to 2 bar.

According to a further preferred embodiment, it can also in particular be provided that the solution can be sprayed into the mixing chamber from the reservoir container by means of a pump and a nozzle at a theoretical spray angle α of 10 to 40°.

It is particularly advantageous if the solution of the ammonia precursor substance is incident on the catalyst end face in a particularly finely distributed manner. Therefore a method for generating ammonia is a further subject matter of the invention, in which the solution of the ammonia precursor substance is applied to the end face of the catalyst in the form of droplets having a droplet diameter $d_{32}$ of less than 25 μm. In this context, according to the present invention, it is preferably further provided that the nozzle generates droplets having a droplet diameter $d_{32}$ of less than 20 μm and most preferably less than 15 μm. Simultaneously or independently, it is further preferred for the nozzle to generate droplets having a droplet diameter $d_{32}$ of more than 0.1 μm and in particular more than 1 μm. When nozzles of this type are used, an ammonia formation level of >95% (see above) can also be achieved. In addition, a particularly uniform distribution of the solution on the catalyst end face can be achieved.

It has further been found to be advantageous for the solution of the ammonia precursor substance to be sprayed into the mixing chamber perpendicular to the catalyst surface. Independently or simultaneously, in this context, the volume ratio of carrier gas to atomisation air is 7:1 to 10:1.

It has further been found to be decisive for the error-free and thus deposition-free operation of an ammonia gas generator that preferably a specific amount of solution reaches a given catalyst end face in a finely distributed manner in a defined period (=volume flow, metered amount). The incidence and the first contact with the foremost part of the catalyst unit (=catalyst end face) has a decisive impact on the complete decomposition of the ammonia precursor.

It has further been shown that the ratio of metered amount and catalyst end face is preferably in a range of 0.17 to 15 g/(h*cm$^2$), in particular of 0.2 to 15 g/h(h*cm$^2$), such that excessive cooling does not take place at the catalyst end face and an excessively low conversion to ammonia sets in. The end face loading is in this context defined as a ratio of the metered mass flow of ammonia precursor solution which reaches the catalyst end face within an hour, and of the catalyst end face which is wetted by the spray cone.

Thus, according to a further aspect, a method is a further subject matter of the present invention, in which the solution of the ammonia precursor substance is introduced into the catalyst unit such that the end face loading of the catalyst is 0.17 to 15 g/(h*cm$^2$), in particular 0.2 to 15 g/(h*cm$^2$), preferably 0.2 to 12 g/(h*cm$^2$). A method is particularly preferred in which the end face loading is at least 0.4 g/(h*cm$^2$), at least 1.0 g/(h*cm$^2$), in particular at least 2.0 g/(h*cm$^2$), in particular at least 3.0 g/(h*cm$^2$) and most preferably at least 4.0 g/(h*cm$^2$). Simultaneously or independently, the end face loading can be in particular at most 12.0 g/(h*cm$^2$), in particular at most 10.0 g/(h*cm$^2$), in particular at most 9.0 g/(h*cm$^2$) and most preferably at most 8.0 g/(h*cm$^2$).

It has been found that, if an excessively large mass flow of ammonia precursor solution were incident on the hot end face, the heating and evaporation of the liquid would lead to excessive local cooling, as a result of which complete conversion is no longer ensured. Measurements have shown that excessively high metered amounts on the catalyst end face and thus excessive end face loading leads to cooling on the wetted end face of well above 100 K and thus the temperature level for complete decomposition on the catalyst end face is fallen short of, and spontaneous further reactions take place, producing undesired by-products.

If the catalyst end face is too large and thus the end face loading is too small, the ammonia gas generator becomes uneconomical, since in this case it is operated with an excessively large catalyst.

From further extensive tests, it has been found that in addition to a defined amount of ammonia precursor solution per catalyst end face, a corresponding amount of energy with respect to the amount of the ammonia precursor solution is also required. In this context is has also surprisingly been found that the total amount of energy for the complete, residue-free conversion of the ammonia precursor solution into ammonia is substantially independent of the ammonia precursor solution which is used. Only the added mass flow of the solution of the ammonia precursor substance correlates with a specific energy flow in the form of an enthalpy flow (essentially a heat flow). It has been shown that, for the endothermic process of the complete conversion of the ammonia precursor solution into ammonia, a defined amount of energy must be available. In this context, it has also been found that in this case, the temperature level at which this decomposition takes place does not need to be taken into consideration. It has been shown that the required temperature level is substantially dependent on the hydrolysis catalysts used, which can offset the necessary decomposition temperatures without the total amount of energy for the decomposition changing as a result.

In the tests, it has been shown that the supplied heat flow can be obtained from a hot gas flow, e.g. hot exhaust from a combustion engine as a transport gas, and can be introduced into the ammonia gas generator via additional active heating (electrical, heat exchanger, heating tube or other heat exchangers by means of heat conduction or radiation).

According to the invention, this results in a preferred specific enthalpy flow in the range of 8000-50000 kJ/kg. In this way, the specific enthalpy flow is defined as a ratio of the enthalpy flow guided into the ammonia gas generator and the metered mass flow of ammonia precursor solution which is guided to the catalyst unit per unit of time. The required energy is in this case incorporated into the generator mainly in the form of heat.

For an excessively large metered mass flow in the case of a given enthalpy flow, the specific enthalpy flow according to this invention is fallen short of, since insufficient energy is supplied to the endothermic reaction. This results in insufficient conversion of the ammonia precursor and thus depositions and the formation of undesired by-products which make continuous operation of the generator impossible. It has also been shown that an excessively large specific enthalpy flow leads to unnecessary loading of the ammonia gas generator and thus to uneconomical operation and to an excessively high loading of the components used.

Thus, a further subject matter of the invention is a method in which the solution of the ammonia precursor substance and a carrier gas are introduced into the mixing chamber, the carrier gas and optionally an additional energy source comprising in total a specific enthalpy flow of $H_{TG} \, m_{Precursor}$ of 8000-50000 kJ/kg (enthalpy flow with respect to the mass flow of solution which is introduced). A method is particularly preferred in which the specific enthalpy flow is at least 10000 kJ/kg, in particular at least 12000 kJ/kg and most preferably at least 15000 kJ/kg. Simultaneously or independently, it can be provided that the specific enthalpy flow is at most 45000 kJ/kg, in particular at most 40000 kJ/kg and most preferably at most 35000 kJ/kg.

Further parameters which are preferably adhered to during the operation of the ammonia gas generator according to the invention are as follows.

The metering mass flow of the solution of the ammonia precursor substance per hour is preferably from 50 g/h to 280 g/h, in particular from 100 g/h to 200 g/h.

The mass flow of carrier gas is preferably 1 to 10 kg/h, in particular 3 to 7 kg/h.

The mass flow of atomisation air is preferably 0.14 to 1.43 kg/h, in particular 0.5 to 1 kg/h.

The additional amount of heating energy is preferably from 0 to 150 W, in particular 50 to 100 W.

The catalyst end face temperature is preferably set to 280 to 500° C., in particular to 300 to 400° C.

The catalyst outlet temperature is preferably set to 250 to 450° C., in particular to 280 to 380° C.

The catalyst space velocity is preferably 5000 to 30000 1/h, in particular 10000 to 20000 1/h.

The metering pressure of the liquid of the ammonia precursor substance is preferably 1 to 8 bar, in particular 1.5 to 3 bar.

The catalyst end face loading per hour is preferably 0.53 to 3.45 g/(h×cm$^2$), in particular 1 to 2 g/(h×cm$^2$).

The specific enthalpy flow is preferably 8000 to 25000 kJ/kg, in particular 10000 to 20000 kJ/kg.

Figure 2:
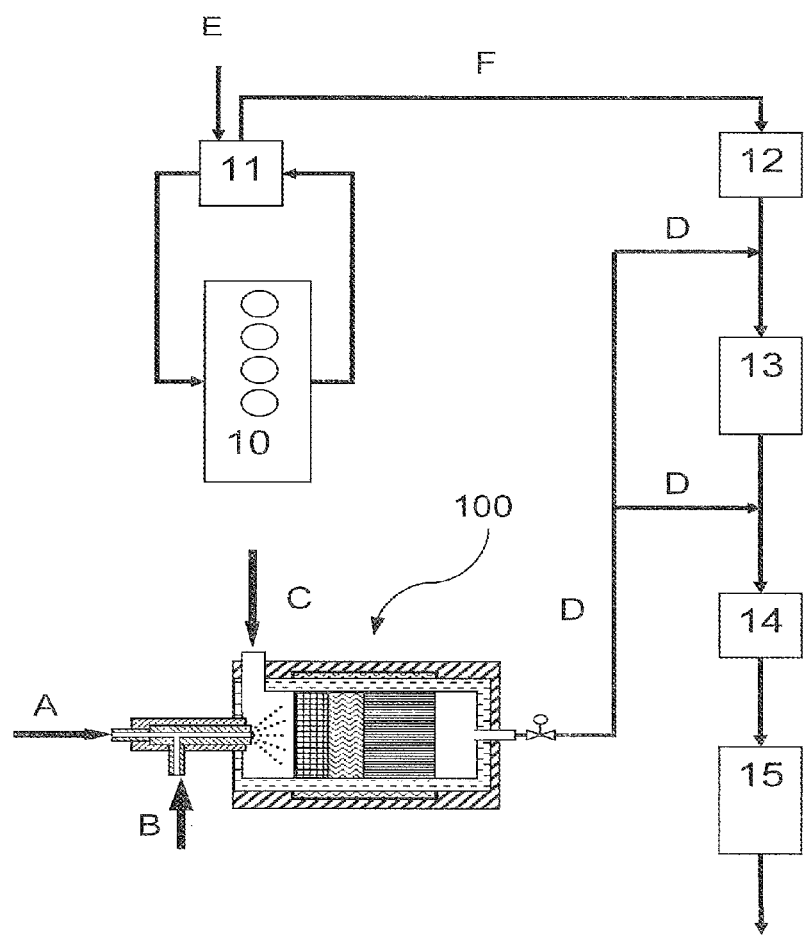
Figure 3:
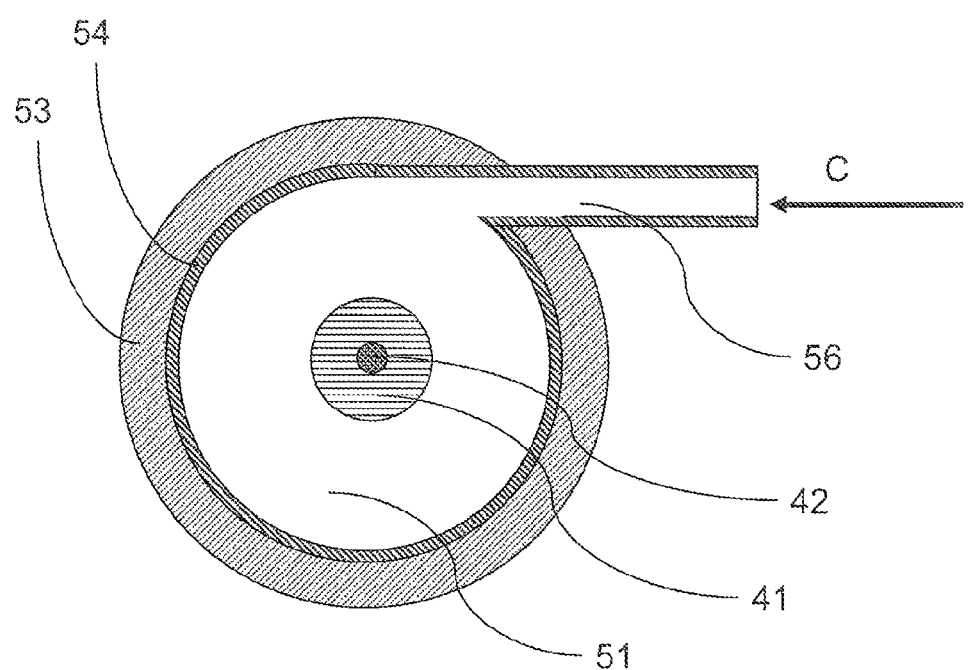
Figure 4:
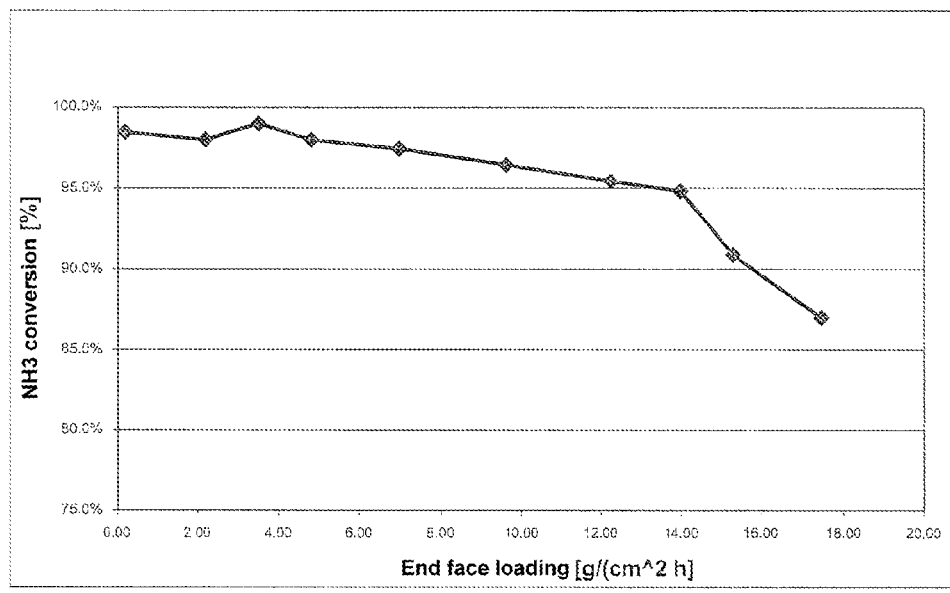

Because of the compact construction thereof, the ammonia gas generators disclosed herein are particularly suitable for use in industrial facilities, in combustion engines such as diesel engines and petrol engines, and gas engines. Therefore, the present invention also includes the use of an ammonia gas generator of the disclosed type and the use of the disclosed method for reducing nitrogen oxides in exhaust from industrial facilities, from combustion engines such as diesel engines and petrol engines, and from gas engines. In the following, the present invention is described in greater detail by way of drawings and associated examples, in which:

FIG. 1 is a schematic axial cross-sectional view of a first ammonia gas generator FIG. 2 shows a schematic construction of an exhaust system in a vehicle FIG. 3 is a radial cross-section of the mixing chamber (plan view) in the region of the tangential carrier gas stream supply FIG. 4 is a diagram 1 showing the conversion of the ammonia precursor solution into ammonia according to the end face load.

Figure 5:
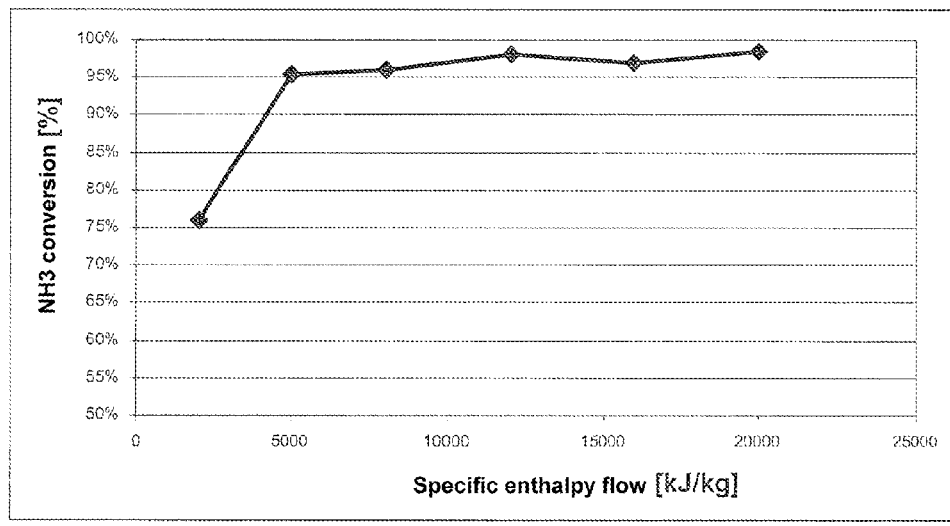

FIG. 5 is a diagram 2 showing the conversion of the ammonia precursor solution into ammonia according to the specific enthalpy flow.

FIG. 1 shows a first ammonia gas generator (100) according to the present invention. The generator (100) is in the form of a cylinder and comprises an injection device (40), a catalyst unit (70) and an outlet (80) for the ammonia gas formed. The catalyst unit (70) consists of a multi-part hydrolysis catalyst (60), a mixing chamber (51) and an outlet chamber (55). In the operating state, the ammonia precursor solution (B) is sprayed out of a reservoir container (20) via a metering pump (30) together with an atomisation air stream (A) via a two-substance nozzle (41) having a nozzle opening (42) into the mixing chamber (51) of the ammonia gas generator (100) at a defined spray angle, and distributed into fine droplets. A hot transport gas stream (C) is additionally introduced into the mixing chamber (51) tangentially via the inlet (56), generating an eddy mist flow comprising the droplets, which is passed axially in the direction of the hydrolysis catalyst (60) onto the hydrolysis catalyst end face (61). The catalyst (60) is configured in such a way that the first segment (62) is in the form of an electrically heatable metal carrier comprising a hydrolysis coating. This is followed by an unheated metal carrier catalyst (63), likewise comprising a hydrolysis coating and an unheated catalyst (64) comprising a hydrolysis coating configured as a mixer structure for better radial distribution. The generated ammonia gas (D) exits the generator (100) together with the hot carrier gas stream via the outlet chamber (55) comprising the outlet (80) and the valve (81). The generator may additionally be heated by a jacket heater (52) around the housing (54) of the catalyst unit. Apart from the head region in which the injection device (40) is located, the ammonia gas generator (100) is enclosed in a thermal insulation (53) of microporous cladding material.

FIG. 2 shows a schematic material flow of an exhaust treatment on a combustion engine (10). In this context, the exhaust from the combustion engine (10) is passed through a charging unit (11) and in a counter flow incoming air (E) for the internal combustion engine is compressed. The exhaust (F) is guided over an oxidation catalyst (12), so as to achieve a higher NO$_2$ concentration in relation to NO. The ammonia-containing gas stream (D) from the ammonia gas generator (100) can be supplied and mixed in both upstream and downstream from a particle filter (13). In this context, an additional gas mixer (14) in the form of a static mixer or for example a Venturi mixer may be used. The NO$_x$ is reduced at the SCR catalyst (15) by means of the reducing agent NH$_3$ at an SCR catalyst (SCR=selective catalytic reduction). In this context, the ammonia gas generator may be operated using separate carrier gas or else using a partial exhaust stream.

FIG. 3 is a detailed view of the mixing chamber (51) in the region of the tangential carrier gas stream supply. The housing (54) of the catalyst unit is enclosed in a thermal insulation (53) of microporous cladding material in the region of the mixing chamber (51). The tangential supply of the carrier gas (C) is provided in the head region of the ammonia gas generator or in the head region of the mixing chamber (51), at the level of the nozzle opening (42) of the nozzle (41). In this context, the inlet (56) for the carrier gas stream (C) is configured in such a way that the gas stream is introduced as shallowly as possible against the wall (54) of the mixing chamber, in such a way that a downwardly directed eddy current in the generator in the direction of the catalyst and thus a tangential carrier gas stream inside the catalyst unit sets in.

PRACTICAL EXAMPLE 1

The construction basically corresponds to the ammonia gas generator shown in FIG. 1. The ammonia generator is configured for a metered amount of 10-100 g/h NH$_3$ and is in the form of a cylindrical tubular reactor. A two-substance nozzle from Schlick, model 970 (0.3 mm), having a variable air cap and coated with amorphous Si, is arranged centrally in the head region. The ammonia precursor substance is metered in at room temperature through this nozzle and atomised in a full cone. The spray angle α is 30°. The distance of the nozzle opening from the catalyst end face is 100 mm and the spray head cone diameter is 54 mm.

In this context, the liquid is entrained, by means of a pressurised air stream (0.5-2 bar) of approximately 0.8 kg/h which is passed through the nozzle, and atomised. The Sauter mean diameter of the resulting droplets below the nozzle is <25 μm. There is a uniform radial distribution of the solution of the ammonia precursor substance over the reactor cross-section in the hot transport gas stream upstream from the hydrolysis catalyst in a mixing chamber, without these touching the reactor wall in the process, which could lead to depositions. In the mixing chamber drops are already evaporating in such a way that upon incidence on the catalyst end face the droplet diameter is reduced by up to 20%. As a result of the droplets which are still present, cooling of approximately 120-150° C. occurs at the catalyst end face. Therefore, the reactor is configured in such a way that the amount of heat supplied with the hot carrier gas stream, the integrated heatable hydrolysis catalyst and further supplies of energy introduce sufficient energy that for the amount of solution metered in there is no cooling to below approximately 300° C. In this context, the metered amount of 50-280 g/h is controlled by means of a Bosch PWM valve. The pressure for conveying the liquid is generated from a pressurised air line in a reservoir container by overpressure, and therefore no additional conveyor pump is required.

A hot carrier gas stream (transport gas stream) of approximately 1-5 kg/h is likewise introduced tangentially in the head region of the ammonia gas generator in such a way that it is laid in a mist stream around the reactor wall and is passed through the mixing chamber in a spiral shape. As a result, sprayed droplets are further prevented from coming into contact with the reactor wall. The diameter of the mixing chamber in the head region of the reactor is 70 mm. The length of the mixing chamber is 110 mm. The mixing chamber is additionally heated from the outside via an electric resistance heating casing (heating time max. 1 min.)—model Hewit 0.8-1 kW, 150-200 mm. The temperature is regulated in connection with temperature sensors (type K) which are arranged in and downstream from the catalyst and on the catalyst end face. All of the outer surfaces of the reactor are enclosed by Microtherm superG insulation. In this context, the Microtherm superG filling is embedded between glass fibre meshing which is wound around the reactor. Only the head region in which the solution is injected is uninsulated, for better heat dissipation. The surfaces in the mixing chamber are coated with catalytically active $TiO_2$ washcoats (anatase structure).

A heatable metal carrier catalyst of 55 mm diameter and 400 cpsi (Emitec Emicat, maximum power 1.5 kW, volume approximately 170 ml) is flange-mounted downstream from the mixing chamber. Said catalyst is in the form of a hydrolysis catalyst, likewise coated with catalytically active $TiO_2$ (anatase, washcoat approximately 100 g/l, from Interkat/Südchemie), and is regulated in such a way that the temperature at the catalyst end face is between 300 and 400° C. In this context, only enough energy is supplied to compensate the cooling resulting from the evaporation of the droplets. To achieve a space velocity of up to at least 7000 1/h, a further hydrolysis catalyst of 400 cpsi is connected downstream, resulting in a total catalyst volume of approximately 330 ml.

The ammonia generated at the hot hydrolysis catalyst flows freely via the outlet chamber in the foot region, centrally from an outlet opening out of the reactor end piece. In this context, the outlet region is preferably shaped conically, so as to prevent eddy formation at edges and thus depositions of possible residues. The gas mixture from the ammonia gas generator is preferably supplied to the motor exhaust stream upstream from the SCR catalyst at a temperature>80° C. to prevent ammonium carbonate depositions, and distributed homogeneously in this exhaust stream by way of a static mixer.

1.4301 (V2A, DIN×5 CrNi 18-10) or alternatively 1.4401 (V4A, DIN×2 CrNiMo 17-12-2), 1.4767, or other Fe Cr Al alloys typical of exhaust catalysts are used as the material for all of the metal components.

This generator was operated with a 60% guanidium formate solution and with a 32.5% aqueous urea solution as well as with mixtures of the two. In this context, the results for these ammonia precursor solutions are approximately identical (±1%).

The operating parameters which should be adhered to during operation of the ammonia gas generator are specified in the following.

TABLE 1 overview of further operating parameters

| Name | Formula | Units | Range from | Range average | Range to |
|---|---|---|---|---|---|
| Metering mass flow of the solution of the ammonia precursor substance per hour | $m_{Red}$ | [g/h] | 50 | 150 | 280 |
| Carrier gas mass flow | $m_{Abg}$ | [kg/h] | 1 | 5 | 10 |
| Atomisation air mass flow | $M_{Duse}$ | [kg/h] | 0.14 | 0.71 | 1.43 |
| Heating energy | $E_{Heiz}$ | [J/s] = [W] | 0 | 70 | 150 |
| Catalyst end face temperature | $T_{ein}$ | [° C.] | 280 | 350 | 500 |
| Catalyst outlet temperature | $T_{aus}$ | [° C.] | 250 | 320 | 450 |
| Catalyst space velocity | RG | [1/h] | 5000 | 15000 | 30000 |
| Metering pressure of the liquid | $P_{Red}$ | [bar] | 1 | 2 | 8 |
| Catalyst end face loading per hour | $m_{Red}/A_{kat}$ | [g/(h * cm$^2$)] | 0.53 | 1.59 | 3.45 |
| Specific enthalpy flow | $H_{TG}/m_{Red}$ | [kJ/kg] | 8000 | 16000 | 25000 |

By means of the inlet which generates a tangential carrier gas stream with respect to the solution injected into the mixing chamber, and the separate introduction of the solution and the carrier gas, depositions can be prevented from forming on the catalyst end face or the mixing chamber wall over a period of >100 hours. Thus, the generator and the method are to be classified as low maintenance.

In the following, the effect of the end face loading and the specific enthalpy flow on the continuous generation of ammonia is specified, the ammonia gas generator used in example 1 being used. This generator was operated with a 60% guanidium formate solution and with a 32.5% aqueous urea solution as well as with mixtures of the two. In this context, the results for these ammonia precursor solutions are approximately identical (±1%). The formation of ammonia according to the end face loading is shown in FIG. 4.

TABLE 2 method according to the end face loading

|  | V1 | V2 | V3 | V4 | V5 |
|---|---|---|---|---|---|
| Distance from nozzle opening to catalyst end face [mm] | 100 | 100 | 100 | 100 | 100 |
| Spray cone diameter [mm] | 54 | 54 | 54 | 54 | 54 |
| Metering mass flow of the solution of the ammonia precursor substance per hour [g/h] | 50 | 160 | 280 | 4 | 400 |
| Catalyst end face loading per hour [g/(h * cm$^2$)] | 2.1 | 7.0 | 12.0 | 0.17 | 17.5 |
| Specific enthalpy flow | 8000 | 12000 | 16000 | 16000 | 16000 |
| Ammonia formation level AG [%] | ≥95% | ≥95% | ≥95% | ≥95% | <90% |
| Depositions on catalyst end face | none | none | none | none | yes |
| Depositions on the mixing wall chamber | none | none | none | none | none |

By setting the catalyst end face loading to at least 0.17 g/(h*cm$^2$) (cf. V4), a method can be provided in which no depositions are formed over a period of >100 h. If the end face loading is 2.1 g/(h*cm$^2$) or 7.0 g/(h*cm$^2$) or 12.0 g/(h*cm$^2$) over a period of >100 h, no depositions are observed, by means of which a continuous method is ensured. If the end face loading is set to a value of 17.5 g/(h*cm$^2$) (cf. V5), depositions on the catalyst end face can be observed. A continuous method is thus no longer possible.

TABLE 3 method according to the specific enthalpy flow

|  | V1 | V2 | V3 | V4 | V5 |
|---|---|---|---|---|---|
| Distance from nozzle opening to catalyst end face [mm] | 100 | 100 | 100 | 100 | 100 |
| Spray cone diameter [mm] | 54 | 54 | 54 | 54 | 54 |
| Metering mass flow of the solution of the ammonia precursor substance per hour [g/h] | 160 | 160 | 160 | 160 | 160 |
| Catalyst end face loading per hour [g/(h * cm$^2$)] | 7.0 | 7.0 | 7.0 | 7.0 | 7.0 |
| Specific enthalpy flow [kJ/kg] | 8000 | 12000 | 16000 | 2000 | 20000 |
| Ammonia formation level AG [%] | ≥95% | ≥95% | ≥95% | <90% | ≥95% |
| Depositions on catalyst end face | none | none | none | yes | none |
| Depositions on the mixing wall chamber | none | none | none | yes | none |

By setting the specific enthalpy to at least 8000 kJ/kg (cf. V1, V2, V3 and V5) a method can be provided in which no depositions are formed over a period of >100 h, by means of which a continuous method can be provided. If the specific enthalpy is adjusted to 2000 kJ/kg (cf. V4), depositions on the mixing wall chamber and the catalyst end face can be observed. The formation of ammonia according to the specific enthalpy flow is shown in FIG. 5.

PRACTICAL EXAMPLE 2

In practical example 2, the reactor is configured in such a way that the reactor is additionally heated in part as a result of counter flow heat exchange by the supplied hot transport gas stream. In this context, the transport gas stream is initially passed below the reactor head, via a double casing, counter to the flow direction in the inside of the double casing, to the reactor wall, and flows around said wall on the way to the reactor head. At the reactor head, the primary flow from the reactor double casing enters the reactor interior from the reactor double casing via a plurality of holes or alternatively via an annular gap in the region of the nozzle at the reactor head. In addition, an electrical resistance heater may be located in the double casing.

PRACTICAL EXAMPLE 3

In practical example 3, the reactor is configured in such a way that the reactor is heated from the outside by heat exchange with hot components of a combustion engine or of a separate burner for exhaust heating or by hot gas flows, rather than by means of an electrical resistance heater. In this context, the heat can also be transported to the reactor via a heating tube over some distance.

PRACTICAL EXAMPLE 4

In practical example 4, the reactor is configured in such a way that heat is supplied directly in the interior of the reactor by means of an electrically heatable Emikat catalyst from Emitec, instead of the reactor being heated from the outside. Alternatively heat can be generated in the reactor by glow plugs, model Champion (60 W, 11 V).

PRACTICAL EXAMPLE 5

With preheating of the liquid solution of the ammonia precursor substance—when an injector having critical superheating (flash evaporator) is used.

The invention claimed is:

1. An ammonia gas generator for generating ammonia gas from a solution of an ammonia precursor substance, comprising:
   a catalyst unit, which comprises a catalyst for decomposing and/or hydrolysing ammonia precursor substances into ammonia gas and a mixing chamber upstream from the catalyst in a flow direction, the catalyst being of a catalyst volume $V_{Kat}$ and the mixing chamber being of a mixing chamber volume $V_{Misch}$;

an injection device for introducing the solution of the ammonia precursor substance into the mixing chamber; and, an outlet for the ammonia gas that is generated, the ammonia gas generator comprising an inlet for a carrier gas which generates a tangential carrier gas stream with respect to the solution of the ammonia precursor substance injected into the mixing chamber, wherein the catalyst unit comprises at least one hydrolysis catalyst, wherein the at least one hydrolysis catalyst is either:

(1) a hydrolysis catalyst that is divided in at least two parts, wherein a first of the at least two parts in the flow direction is in the form of a heated catalyst heated by a heater and wherein a second of the at least two parts in the flow direction is in the form of an unheated catalyst; or (2) two hydrolysis catalysts arranged one behind the other, a first of the two hydrolysis catalysts being a heated catalyst heated by a heater and a second of the two hydrolysis catalysts being an unheated catalyst.

2. The ammonia gas generator of claim 1, wherein the catalyst unit is in the form of a cylinder.

3. The ammonia gas generator of claim 1, wherein a ratio of a diameter D of the catalyst to a length L of the catalyst is 1:3.

4. The ammonia gas generator of claim 1, wherein the injection device comprises a nozzle which comprises a first number of nozzle openings for introducing the solution of the ammonia precursor substance into the catalyst unit, wherein the first number of nozzle openings are annularly surrounded by a second number of nozzle openings for introducing an atomisation gas into the catalyst unit.

5. The ammonia gas generator of claim 1, wherein the catalyst is a hydrolysis catalyst having a catalyst cell count of at least 100 cpsi to at most 400 cpsi catalyst cells per end face of the hydrolysis catalyst.

6. The ammonia gas generator of claim 1, wherein the catalyst comprises a catalytically active coating which is impregnated with at least one of gold and palladium.

7. The ammonia gas generator of claim 1, wherein the heater comprises at least one of a direct electrical resistance heater and a jacket heater.

8. The ammonia gas generator of claim 1, wherein the catalyst unit comprises at least one thermal insulation layer of microporous cladding material.

9. The ammonia gas generator of claim 1, wherein the second part of the at least two parts of the hydrolysis catalyst is followed in the flow direction by a third part, wherein the third part is an unheated catalyst having a mixer structure.

10. A method for generating ammonia as from a solution of an ammonia precursor substance by means of an ammonia gas generator comprising:

a catalyst unit, which comprises a catalyst for decomposing and/or hydrolysing ammonia precursor substances into ammonia gas and a mixing chamber upstream from the catalyst in a flow direction, the catalyst being of a catalyst volume $V_{Kat}$ and the mixing chamber being of a mixing chamber volume $V_{Misch}$;

an injection device for introducing the solution of the ammonia precursor substance into the mixing chamber; and, an outlet for the ammonia gas that is generated, the method comprising:

introducing the solution of the ammonia precursor substance into the mixing chamber separately from a carrier gas; and introducing the carrier gas tangentially to the solution of the ammonia precursor substance, wherein the catalyst unit comprises at least one hydrolysis catalyst, wherein the at least one hydrolysis catalyst is either:

(1) a hydrolysis catalyst that is divided in at least two parts, wherein a first of the at least two parts in the flow direction is in the form of a heated catalyst heated by a heater and a second of the at least two parts in the flow direction is in the form of an unheated catalyst; or (2) two hydrolysis catalysts arranged one behind the other, a first of the two hydrolysis catalysts being a heated catalyst heated by a heater and a second of the two hydrolysis catalysts being an unheated catalyst.

11. The method of claim 10, wherein a partial stream of an exhaust containing less than 5% vol % percent of a total exhaust is used as the carrier gas.

12. The method of claim 10, wherein the solution of ammonia precursor substance is sprayed from a reservoir container into the mixing chamber by a pump at a spray angle of 10 to 40° relative to a face of the catalyst unit.

13. The method of claim 10, wherein the solution of ammonia precursor substance is applied to an end face of the catalyst in the form of droplets having a droplet diameter $D_{32}$ of less than 20 µm.

14. The method of claim 10, wherein a volume ratio of carrier gas to atomisation air in the mixing chamber is 7:1 to 10:1.

15. The method of claim 10, wherein the solution of ammonia precursor substance is injected at a pressure of at least 0.5 bar and atomisation air is injected at a pressure of 0.5 to 2 bar.

16. The method of claim 10, wherein the solution of ammonia precursor substance is introduced into the catalyst unit such that a catalyst end face loading is 0.2 to 12 g/(h*cm$^2$).

17. The method of claim 10, wherein the solution of ammonia precursor substance is sprayed into the mixing chamber perpendicular to a surface of the catalyst unit.

18. The method of claim 10, wherein the solution of ammonia precursor substance is introduced into the mixing chamber together with the carrier gas, wherein the carrier gas and optionally an additional energy source have in total a specific enthalpy flow of $H_{TG}/m_{Precursor}$ of 8000-50000 kJ/kg, where the enthalpy flow is with respect to the introduced mass flow of solution.

19. The method of claim 10, wherein the carrier gas is a nitrogen oxide containing gas selected from the group consisting of: exhaust from industrial facilities, from combustion engines, from gas engines, from diesel engines and from petrol engines.

20. The method of claim 10, wherein the heater comprises at least one of a direct electrical resistance heater and a jacket heater.

21. The method of claim 10, wherein the second part of the at least two parts of the hydrolysis catalyst is followed in the flow direction by a third part, wherein the third part is an unheated catalyst having a mixer structure.

22. The method of claim 10, wherein the solution of ammonia precursor substance is introduced into the catalyst unit such that a catalyst end face loading is 3.0 to 15 g/(h*cm$^2$).

23. A method for reducing nitrogen oxides in exhaust from industrial facilities, from combustion engines, from gas engines, from diesel engines or from petrol engines, comprising treating an exhaust from an industrial facility, a combustion engine, a gas engine, a diesel engine or a petrol engine with the ammonia gas generated by the ammonia gas generator of claim 1.

* * * * *